(12) United States Patent
Norup et al.

(10) Patent No.: US 12,071,191 B2
(45) Date of Patent: Aug. 27, 2024

(54) LOCKING SYSTEM FOR A BICYCLE

(71) Applicant: PentaLock ApS, Aalborg (DK)

(72) Inventors: Emil Norup, Støvring (DK); Thomas Martin Jessen, Aalborg (DK); Mathias Herseth Fischer, Randers NV (DK); Nadiim Nafei, København Ø (DK); Jesper Mortensen, Aalborg (DK)

(73) Assignee: PentaLock ApS, Aalborg (DK)

( * ) Notice: Subject to any disclaimer, the term of this patent is extended or adjusted under 35 U.S.C. 154(b) by 861 days.

(21) Appl. No.: 16/981,675

(22) PCT Filed: Mar. 20, 2019

(86) PCT No.: PCT/DK2019/050098
§ 371 (c)(1),
(2) Date: Sep. 16, 2020

(87) PCT Pub. No.: WO2019/179587
PCT Pub. Date: Sep. 26, 2019

(65) Prior Publication Data
US 2021/0031849 A1    Feb. 4, 2021

(30) Foreign Application Priority Data
Mar. 20, 2018   (DK) ............................ PA 2018 70176

(51) Int. Cl.
*B62H 5/10*     (2006.01)
*B62H 5/14*     (2006.01)
(52) U.S. Cl.
CPC ............... *B62H 5/10* (2013.01); *B62H 5/148* (2013.01)
(58) Field of Classification Search
CPC ....... E05B 47/00; E05B 47/0002–0006; E05B 2047/0007; E05B 2047/0028;
(Continued)

(56) References Cited

U.S. PATENT DOCUMENTS

2011/0108373 A1*  5/2011  Toal .................... B62H 5/10
                                                  188/78

FOREIGN PATENT DOCUMENTS

CN     102066188 A    5/2008
CN     101748937 A    6/2010
(Continued)

OTHER PUBLICATIONS

International Search Report issued in corresponding PCT Application No. PCT/DK2019/050098, date mailed Jul. 2, 2019, pp. 1-3.
(Continued)

*Primary Examiner* — Nathan Cumar
(74) *Attorney, Agent, or Firm* — Robinson & Cole LLP

(57) ABSTRACT

A bicycle locking system for mounting in a bicycle including an axle which is rotatable around its longitudinal axis, a first locking element and a second locking element, which are configured for locking engagement with each other, where the first locking element is fixed to the axle and each of the first and second locking elements comprise an engagement surface. The locking system also includes a biasing device and an actuation element, the biasing device configured to exert a force on the second locking element in the longitudinal direction, so as to displace the first and second locking elements in relation to each other, where the biasing device is a magnetic biasing device, and the actuation element acts to switch the locking system between a state where the biasing device magnetically repels the second locking element and a state where the biasing device magnetically attracts the second locking element.

11 Claims, 11 Drawing Sheets

(58) Field of Classification Search
CPC ..... E05B 2047/0033; E05B 2047/0038; E05B 63/24; E05B 15/00; E05B 15/0073; B62H 5/00; B62H 5/10; B62H 5/14; B62H 5/148
USPC .......................................................... 70/236
See application file for complete search history.

(56) References Cited

FOREIGN PATENT DOCUMENTS

| CN | 203651968 U | 6/2014 |
|---|---|---|
| CN | 105416443 A | 3/2016 |
| CN | 106586778 A | 4/2017 |
| CN | 106965876 A | 7/2017 |
| CN | 206307180 U | 7/2017 |
| DE | 19529398 A1 | 1/1996 |
| DE | 102009033475 A1 | 1/2011 |
| EP | 2657437 A2 | 10/2013 |
| JP | 2000095164 A | 4/2000 |
| KR | 20180025142 A | 3/2018 |
| WO | 2004069635 A1 | 8/2004 |
| WO | 2009136801 A1 | 11/2009 |
| WO | WO-2017081661 A1 * | 5/2017 |

OTHER PUBLICATIONS

Search Opinion issued in corresponding DK Application No. PA 2018 70176, dated May 2, 2018, pp. 1-2.
Written Opinion issued in corresponding PCT Application No. PCT/DK2019/050098, date mailed Jul. 2, 2019, pp. 1-6.

* cited by examiner

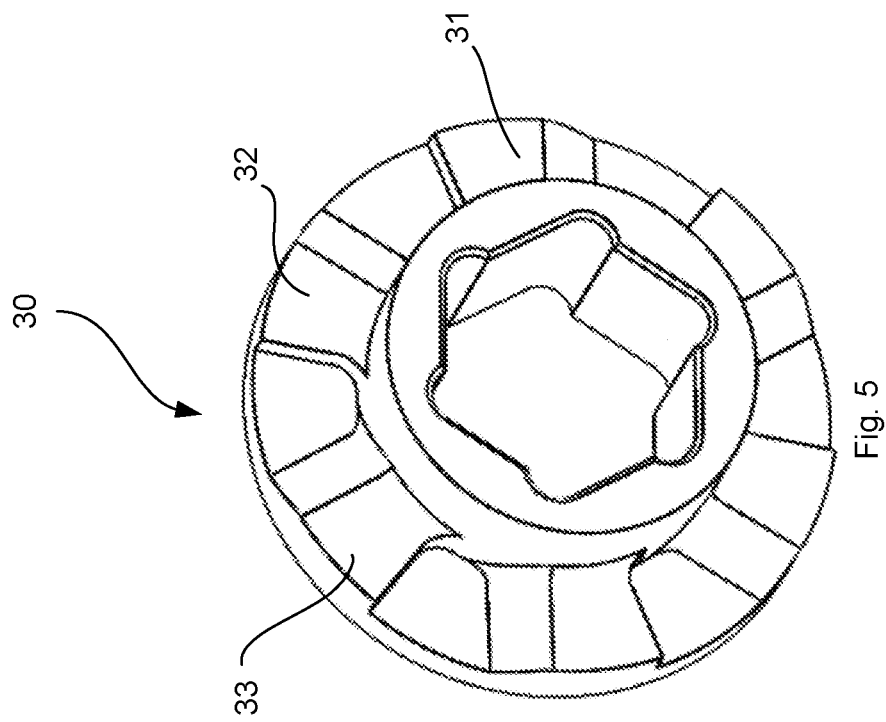
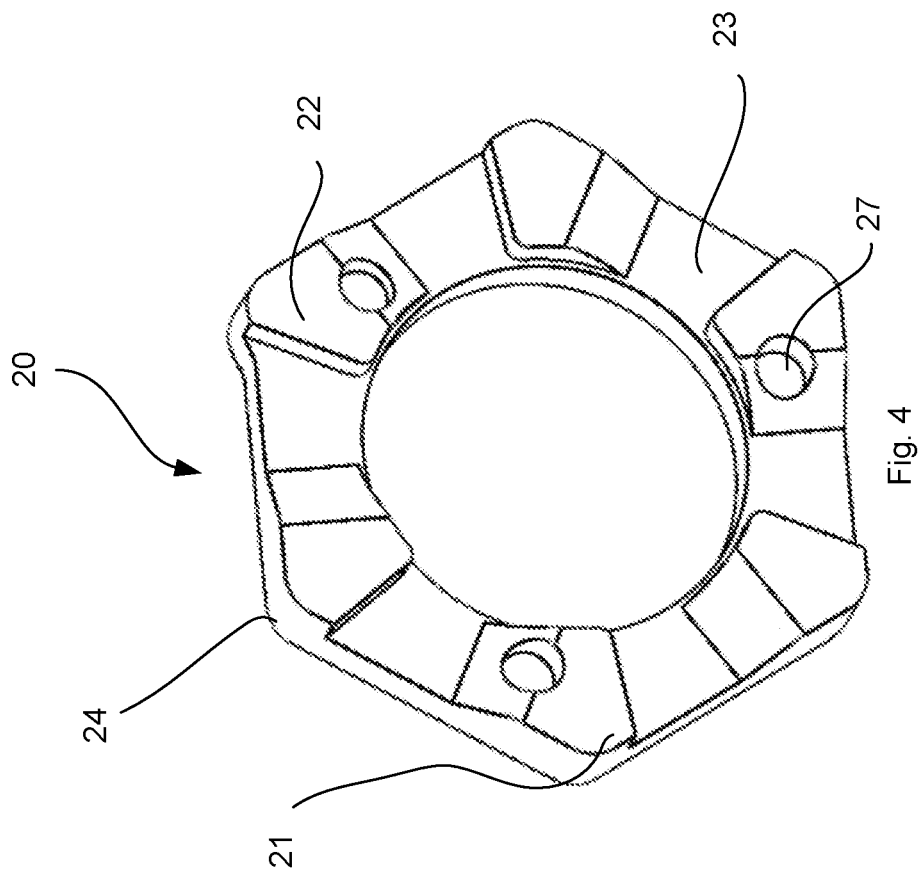

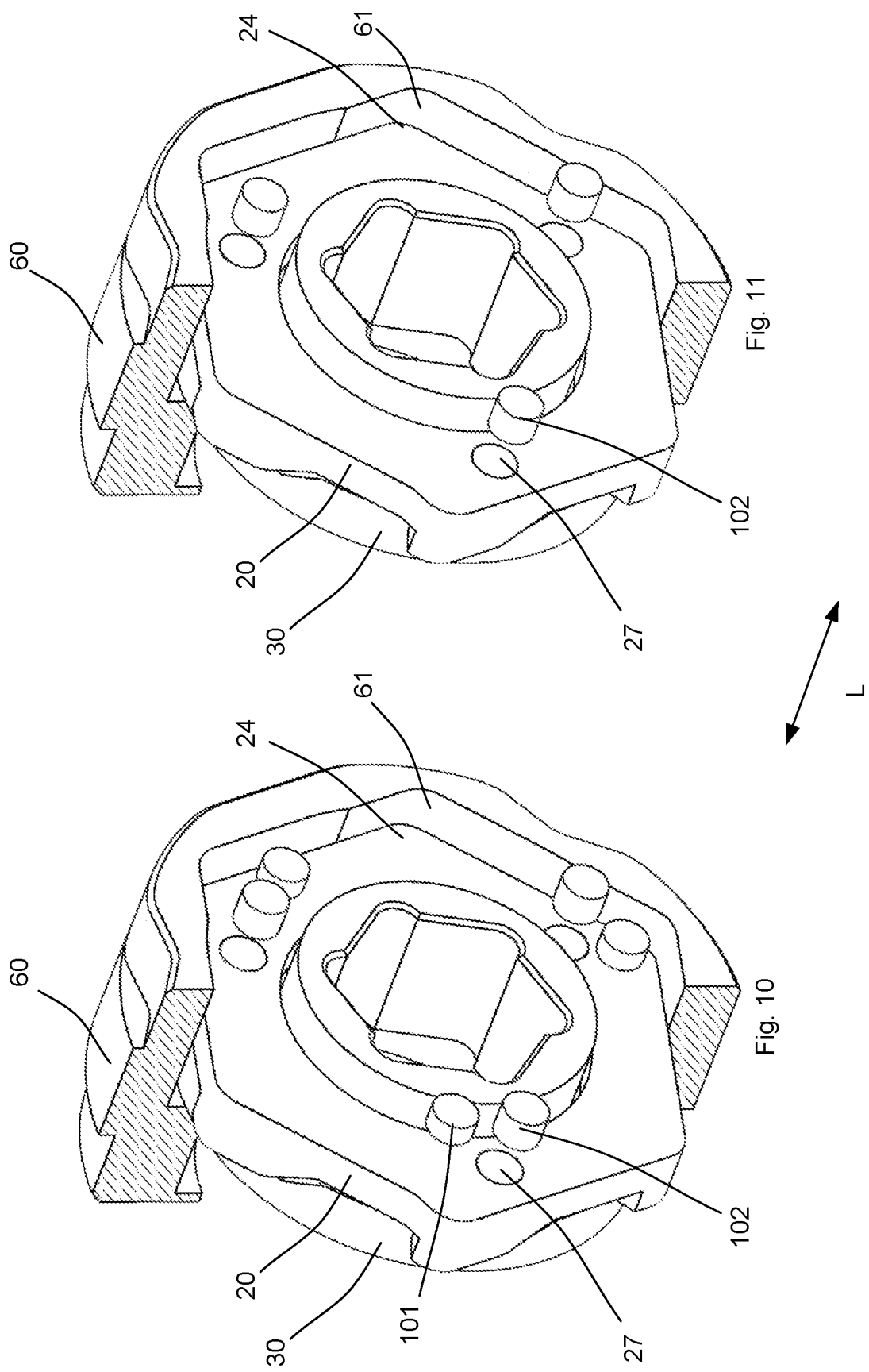

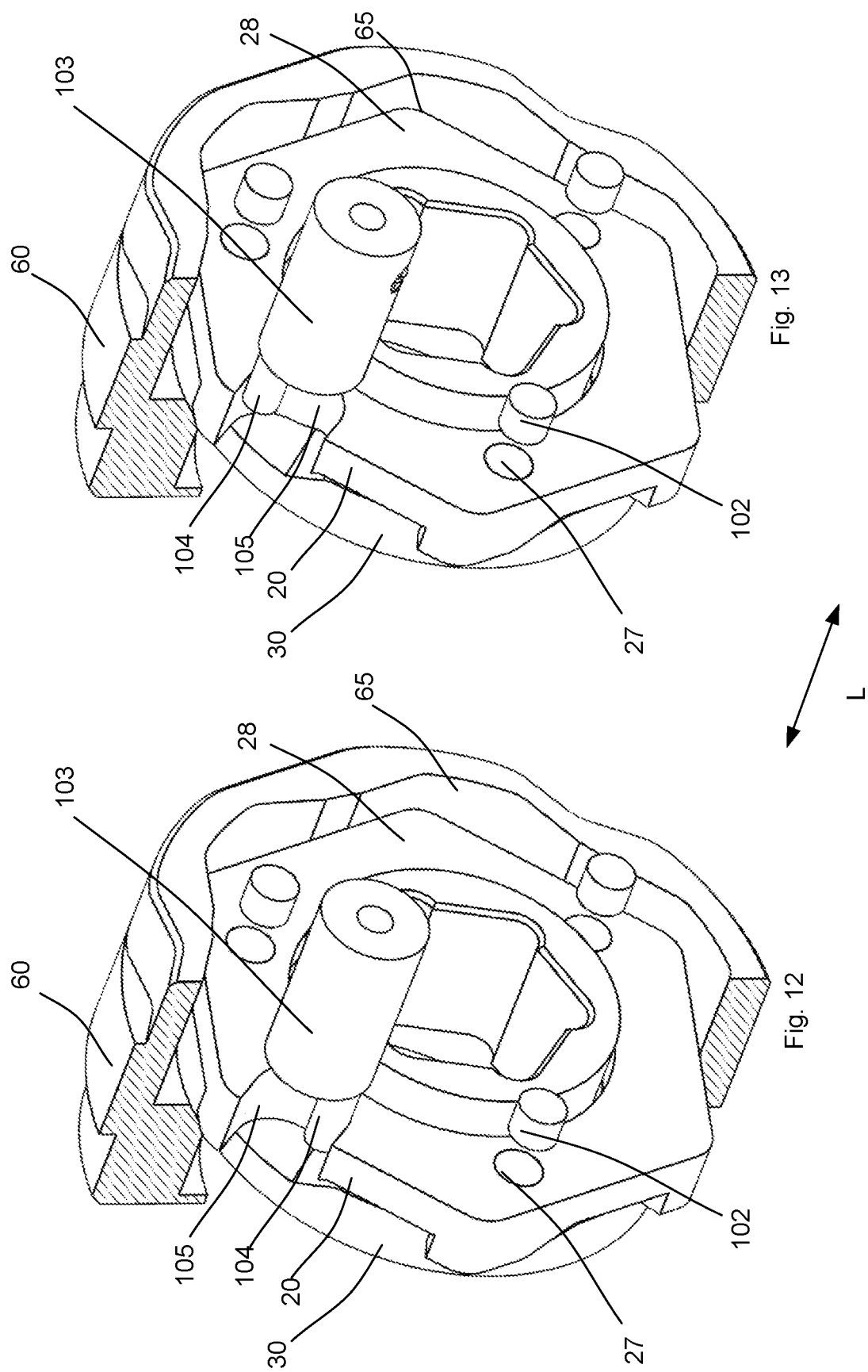

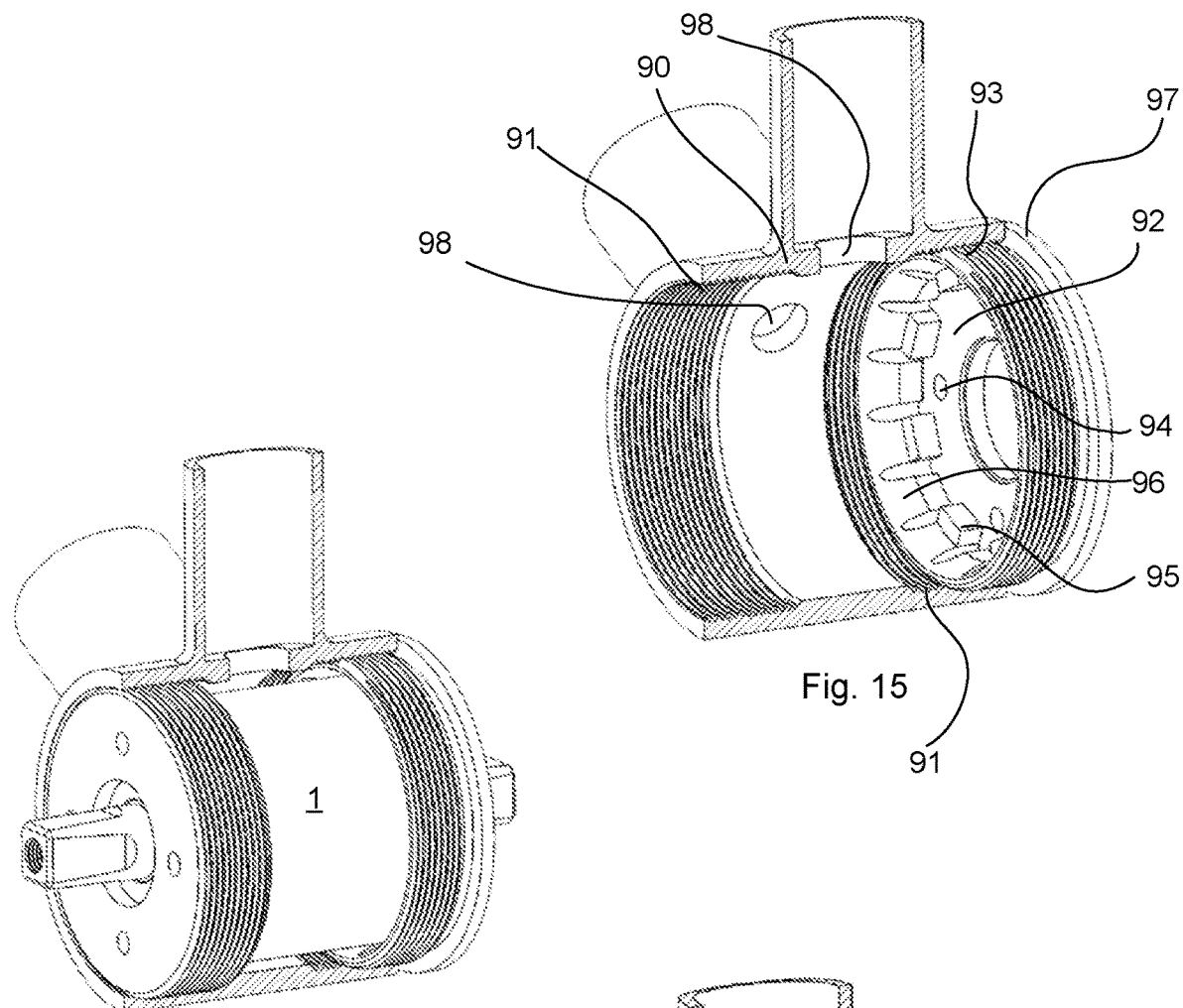
Fig. 15
Fig. 16
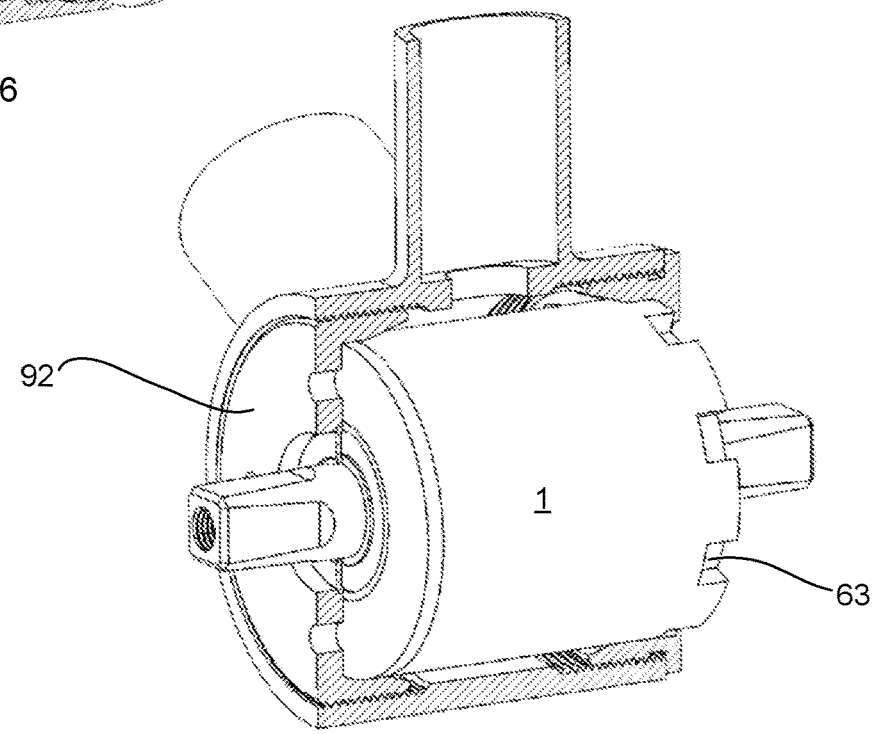
Fig. 17

LOCKING SYSTEM FOR A BICYCLE

FIELD OF THE INVENTION

The present invention relates to a bicycle locking system. The invention further relates to a bicycle comprising such a locking system.

BACKGROUND OF THE INVENTION

Bicycle theft is a common problem in many places around the world. To prevent bicycle theft, most bicycles have a lock mounted thereon or have a separate lock. Traditional locking systems for bicycles work by fixating the bicycle to a fixed object, such as a street light, and/or by blocking a wheel of the bicycle, most commonly by means of a chain, wire, or U-lock.

Such locking systems suffer from several drawbacks. Most crucially is that they are almost always locked/unlocked using a key and are all easy to tamper with as they are arranged externally on the bicycle. It is thus possible for a thief to break open the locking system, either by using tools to destroy the lock itself or by forcefully operating the key mechanism. Furthermore, separate locks require the cyclist to carry around the lock when not used or mount it on a separate mounting bracket on the bicycle.

DE 195 29 398 A1 discloses a locking system mounted in the bottom bracket shell of a bicycle. The locking system comprising two toothed rims arranged co-axially with the crank axle, one being non-rotatable and displaceable along the crank axle, and the other being rotatable and fixed to the crank axle, so that the former of the two toothed rims may be displaced into engagement with the later to prevent the crank axle from rotating, thereby locking the bicycle.

DE 445139 A discloses a similar locking system to that of DE 195 29 398 A1, wherein the displaceable toothed rim is urges towards the other by a set of springs. While these locking system are incorporated into the bicycle, thereby alleviating the bicycle user from carrying around a separate lock, it is still operated by a key and thus accessible from the outside of the bicycle frame. This allows the locking system to be tampered with, thus making it possible for thieves to forcefully disengage the two toothed rims to unlock the bicycle. Furthermore, both systems require the cyclist to bend down to lock/unlock the locking systems, thus presenting a minor inconvenience when operating the lock.

On this background, it is an object to provide an improved locking system for bicycles, which is both more convenient to lock and unlock and more difficult to forcefully unlock, and which also ensures that the bicycle will be locked correctly regardless of the angular position pedals.

SUMMARY OF THE INVENTION

In a first aspect of the invention, the objects laid out in the background are achieved by a bicycle locking system for being mounted in a bicycle, the locking system comprising an axle extending in a longitudinal direction, said axle being rotatable around its longitudinal axis; a first locking element and a second locking element configured for locking engagement with each other, said first locking element being fixed to the axle and each of the first and second locking elements comprising an engagement surface, said engagement surfaces comprising mutually corresponding protrusions and cavities, wherein the first and second locking elements are arranged at the axle with the engagement surfaces facing each other, and wherein the first and second locking elements are displaceable in relation to each other along the longitudinal axis so that the first and second locking elements are movable between an engaged state and a disengaged state, wherein, in the engaged state where the first and second locking elements are in locking engagement with each other, the first locking element is in an angular position, where the protrusions are aligned with the corresponding cavities, and the first and second locking elements are in a position in the longitudinal direction in relation to each other so that the protrusions are accommodated in the cavities, and wherein, in the disengaged state, the first and second locking elements are distanced from each other in the longitudinal direction so that the protrusions are not accommodated in the corresponding cavities, characterized in that the locking system further comprises a biasing device and an actuation element, said biasing device being configured for exerting a force on the second locking element in the longitudinal direction, so as to displace the first and second locking elements in relation to each other, where the biasing device is a magnetic biasing device, and said actuation element acting to switch the locking system between a state where the biasing device magnetically repels the second locking element and a state where the biasing device magnetically attracts the second locking element.

A magnetic biasing device may have the effect of providing a continuous force of repulsion or attraction, such that in the engaged state of the locking elements, the force of the magnet biasing device acts to continuously force the locking elements together, further ensuring that the locking elements remain in the engaged state. Similarly, in the disengaged state, the magnetic force may act to continuously force the locking elements apart, so ensuring the locking elements remain in the disengaged state.

This is further advantageous as it ensures that the first and second locking elements will be brought into the engaged state, even when the biasing device is actuated and the first and second locking elements are displaced in relation to each other while the first locking element is in an angular position, in which the protrusions and cavities are misaligned. In such events, the engagement surfaces of the locking elements may be in contact, even though the protrusions have not been displaced into the cavities, resulting in an unlocked bicycle. Because the biasing device continues to exert a force on one or both of the first and second locking elements, the locking system of the invention will self-lock in such cases when the axle is rotated, e.g. by a thief, as the biasing device will displace the first and/or second locking elements the remaining distance required for the protrusions to engage the cavities, once the axle, and thereby the first locking element, is rotated to an angular position, in which the protrusions and the cavities are aligned.

The locking system may further comprise at least one hall sensor for detecting that the engaged or disengaged state of the first and second locking elements has been achieved. The at least one hall sensor may detect the position of the first and/or second locking element.

The actuation element facilitates a more convenient and reliable locking and unlocking of the bicycle as the actuation element can be configured for the specific purpose of switching the biasing device between a position of magnetic repulsion and a position of magnetic attraction, or vice versa, in relation to the second locking element i.e. the actuation element may be configured to only move between the two positions. The actuation element may provide feedback to further assure the user that the engaged or disengaged state of the locking system has been achieved. The feedback may be audio and/or tactile feedback.

In an embodiment of the invention, the actuation element may be spring loaded.

The term "for being mounted in a bicycle" is to be understood as being permanently installed in a bicycle e.g. being permanently fixed to a part of the frame of the bicycle such that the lock remains fixed to the bicycle both when in an engaged and disengaged state.

In a presently preferred embodiment of the locking system, the locking system of the invention is adapted to be housed in the bottom bracket shell of a bicycle frame and the axle to be connected to the crankset and pedals. Alternatively, it is also possible to mount the locking system of the invention in other types of pedal driven cycle types, such as tandems, tricycles, or unicycles.

By providing a locking system for being mounted in in a bicycle e.g. in the bottom bracket shell of the bicycle, wherein the locking elements are displaced in relation to each other by means of a biasing device, the bicycle may be locked by a locking system arranged internally in the frame. Such a locking system will be safer than those described in the background as the locking system does not require any external key access, as the actuation element may be actuated by the likes of a keypad, remote or the like, thereby making it more difficult for thieves to break the lock or force it open.

The force exerted by the biasing device on the second locking element displaces the second locking element between the engaged and the disengaged state, or vice versa, with the first locking element.

The engaged and disengaged states may otherwise be denoted the engaged and disengaged positions, respectively. Furthermore, the engaged and disengaged positions may be denoted the locked and unlocked position, respectively.

The first and second locking elements may be arranged concentrically with the axis of rotation of the axle.

In an alternative embodiment, the locking system is adapted to be mounted in an electric bicycle, wherein the axle is adapted to be connected to the electric motor driving the electric bicycle. In such an embodiment, the locking system can be built into the electric motor driving the electric bicycle. In another alternative embodiment, the locking system is adapted to be mounted in the wheel hub of a bicycle, wherein the axle is adapted to be fixedly attached to the frame of the bicycle and rotatably connected to the wheel hub, and wherein the second locking element is non-rotatably connected to the wheel hub.

In an embodiment of the invention, the protrusions are provided by triangular teeth on the engagement surfaces of the first and second locking elements and the corresponding cavities are provided by the space between the teeth. Such embodiments may improve the locking of the locking system as the inclined side walls of the protrusions on the second locking element may slide against the inclined side walls on the first locking element, thereby helping the first locking element get into an angular position in which the protrusions are aligned with the corresponding cavities.

In one such embodiment, the respective triangular teeth have one side wall which is perpendicular to the engagement surface and one side wall which is inclined with respect to the engagement surface. By providing the triangular teeth with a perpendicular side wall and a side wall with a less than 15 degrees steep slope, the locking system may be adapted to, when in the engaged state, allow the teeth to cam over in one rotational direction and prevent the teeth from camming over in the opposite rotational direction. This may allow the cyclist to use a pedal break, i.e. rotate the axle in the rotational direction opposite the driving direction, even if the locking system should be engaged by mistake during use of the cycle.

In another embodiment of the invention, the protrusions are provided by square teeth on the engagement surfaces of the first and second locking elements and the corresponding cavities are provided by the spaces between the teeth, said teeth having two side walls which are perpendicular to the engagement surface. By providing the protrusions by square teeth with perpendicular side walls, the locking system will be harder to forcefully unlock from the engaged state as perpendicular side walls of the square teeth will prevent the teeth from camming over when a torque is applied on the axle.

In an embodiment of the invention, the first and second locking elements are provided by circular discs with a central through hole through which the axle extends. By providing the locking elements as circular discs, the moment of inertia will be as small as possible, thereby making it easier for the cyclist to rotate the axle and the first locking element. Furthermore, circular discs provide a large area to circumference ratio of the engagement surface, thereby enabling the locking system to be made compact.

In an embodiment, the second locking element is non-rotatable. This has the effect of providing a locking system where the second locking element is always in the same orientation. This is advantageous when the second locking element is displaced by the magnetic biasing device as the magnets on the second locking element will always be in the same position as the second locking element cannot rotate.

In an embodiment, the biasing device comprises at least one permanent magnet.

The biasing device may comprise zones of magnetized areas. The biasing device may comprise 2, 3, 4, 5, 6, 7, 8, 9, 10 or more permanent magnets. The biasing device may comprise a permanent magnet arranged at every 180, 120, 90, 72, 60, 51.43, 45, 40, 36 degrees about the longitudinal axis of the axle.

The north or south pole of the least one permanent magnet faces in the direction towards the second locking element.

The use of permanent magnets provides a more efficient locking system as the power required compared to electro magnets, is reduced. It may further provide a more reliable lock system compared to electro magnets, as permanent magnets are not dependent on an electric power supply to function.

In an embodiment the biasing device comprises at least two permanent magnets. The two permanent magnets may be arranged such that a north pole of one of the permanent magnets and a south pole of the other permanent magnet face in the same direction towards the second locking element.

The direction towards the biasing device may be substantially in the longitudinal direction. The direction towards the second locking element may be substantially in the longitudinal direction.

In an embodiment, the second locking element comprises at least one permanent magnet.

The second locking element may comprise zones of magnetized areas. The second locking element may comprise 2, 3, 4, 5, 6, 7, 8, 9, 10 or more permanent magnets. The second locking element may comprise a permanent magnet arranged at every 180, 120, 90, 72, 60, 51.43, 45, 40, 36 degrees about the longitudinal axis of the axle.

One of the poles of the at least one magnet may face in the direction towards the biasing device.

In an embodiment the second locking element comprises at least two permanent magnets. The two permanent magnets may be arranged such that a north pole of one of the magnets and a south pole of the other magnet face in the direction towards the biasing device.

In an embodiment, the biasing device comprises two permanent magnets in the form of a primary and secondary magnet. A north pole of one of the primary or secondary magnets and a south pole of the other of the primary and secondary magnet may face in the direction towards the second locking element. The second locking element may comprise one permanent magnet in the form of a tertiary magnet, where the north or south pole of the tertiary magnet faces in the direction towards the biasing device.

This has the technical effect of allowing the biasing device to magnetically repel and attract the second locking element where the second locking element comprises only one permanent magnet.

In an embodiment, the biasing device comprises one permanent magnet in the form of a tertiary magnet, where the north or south pole of the tertiary magnet faces in the direction towards the second locking element. The second locking element may comprise two permanent magnets in form of a primary and secondary magnet. A north pole of one of the primary or secondary magnet and a south pole of the other of the primary and secondary magnet may face in the direction towards biasing device.

This has the technical effect of allowing the biasing device to magnetically repel and attract the second locking element where biasing device comprises only one permanent magnet.

In an embodiment, the second locking element is made from a ferromagnetic material, such as steel. This has the effect of allowing the second locking element itself to be magnetically attracted. In this way it may be possible to provide a second element comprising just one permanent magnet that may be magnetically repelled and attracted by the biasing device.

In an embodiment, the actuation element is electrically actuated.

The actuation element may be a stepper motor, a linear actuator, a lead screw, or the like.

In an embodiment of the invention, the actuation element is an electric DC-motor. In such an embodiment, the locking system comprises an internal power source and/or is adapted to be connected to an external power source arranged in the bicycle to power the motor. In an embodiment, the locking system comprises an internal power source, which is adapted to be connected to a dynamo of the bicycle adapted to charge.

The actuation element being electrically actuated provides the convenience of being able to lock and unlock the bicycle through the press of a button.

In an embodiment, the actuation element physically moves the second locking element.

This facilitates a switch between a state of magnetic repulsion and attraction of the biasing device in relation to the second locking element, by physically moving the biasing device.

In an embodiment, the actuation element physically moves the biasing device by angular displacement.

This facilitates a switch between a state of magnetic repulsion and attraction of the biasing device in relation to the second locking element, by angularly displacing the biasing device. This allows the spacing in the locking system to be utilised optimally and so provide a compact locking system.

In an embodiment, the actuation element physically moves the biasing device.

This facilitates a switch between a state of magnetic repulsion and attraction of the biasing device in relation to the second locking element, by physically moving the biasing device.

In an embodiment, the actuation element physically moves the biasing device by angular displacement.

This facilitates a switch between a state of magnetic repulsion and attraction of the biasing device in relation to the second locking element, by angularly displacing the biasing device. This allows the spacing in the locking system to be utilised optimally and so provide a compact locking system.

The locking system may further comprise a hall sensor for detecting if the biasing device is in a position of magnetic repulsion or magnetic attraction in relation to the second locking element.

In an embodiment, the biasing device has an axis of rotation and is arranged coaxially with an axis of rotation of the axle.

The biasing device may be disc-shaped, triangular, square, cylindrical or any other appropriate shape. This allows the biasing device to be optimally adapted to the spacing available in the locking system.

In an embodiment, the bike locking system further comprises a wireless communications unit for actuating the actuation element.

By providing a wireless communication unit, the cyclist may lock/unlock the bicycle remotely, thereby removing external access to the locking system. This will make it even harder for a thief to unlock the bicycle by means of force. The remote unlocking also further improves the convenience for the cyclist as the bike may be unlocked before the cyclist is at the bicycle such that it is ready to ride once the cyclist arrives at the bicycle.

In an embodiment a device for unlocking the bicycle may be provided. This may be in the form of a number pad, a remote or the like. A smartphone app may also be used.

In an embodiment of the invention, the locking system further comprises a cylindrical outer housing extending parallel with the longitudinal axis, the cylindrical housing enclosing the first and second locking elements and the biasing device, wherein the axle extends through the cylindrical outer housing. By enclosing the components of the locking system in a cylindrical housing, it will become more difficult to tamper with the locking system as a thief will not only have to access the internals of the frame of the bicycle such as the bottom bracket shell but also open the outer housing.

The outer housing is preferably closed at each end by a circular closing element, the closing elements having a central through hole through which the axle extends. In some such embodiments, a ball bearing supporting the axle is arranged in each of the through holes.

In a second aspect of the invention, the objects laid out in the back-ground section are solved by bicycle comprising a bicycle locking system of the first aspect of the invention, wherein the locking system is arranged in the bottom bracket shell of the bicycle frame. Such a bicycle may benefit from the advantages described above.

In a development of the previous embodiment the locking system is arranged in the bottom bracket shell of the bicycle frame, and wherein the bottom bracket shell is closed in the longitudinal direction by end caps having a central through hole, through which the axle extends, and said end caps comprising a cylindrical portion extending into the bottom bracket shell, wherein the locking system is fixed in the cylindrical portions of at least one of the end caps.

At least one of the end caps may be fixed to the bottom bracket shell by welding, gluing etc.

In an embodiment of the invention, the locking system is fixed in the cylindrical portions of the two end caps.

In a development of the previous embodiment, said cylindrical portions have an inner diameter smaller than the diameter of the bottom bracket shell so that a gap is formed between the locking system and the bottom bracket shell around the locking system.

By providing end caps with a cylindrical portion extending into the bottom bracket shell of the bicycle frame, the locking system of the first aspect of the invention may rest on the cylindrical portions, thereby providing an air gap between the locking system and the inner surface of the bottom bracket shell around the locking system. The air gap may be used to accommodate wiring extending to or from the locking system, thus making it possible to connect the locking system to other devices, such as for example an external power source.

BRIEF DESCRIPTION OF THE DRAWINGS

The invention will be described in more detail below by means of non-limiting examples of embodiments and with reference to the schematic drawing, in which:

FIG. 4 shows a perspective view of the second locking element from FIG. 1;

FIG. 5 shows a perspective view of the first locking element from FIG. 1;

FIG. 10 shows a perspective view of the locking elements in the engaged state inside a housing;

FIG. 11 shows a perspective view of a different embodiment of the locking elements in the engaged state inside a housing;

FIG. 12 shows a perspective cut-away view of another embodiment of the locking system in the engaged state;

FIG. 13 shows a perspective cut-away view of another embodiment of the locking system in the engaged state where the actuation element has been actuated;

FIG. 15 shows a schematic cut-away view of bottom bracket shell of a bicycle;

FIG. 16 shows a schematic cut-away view of a locking system of the invention mounted in a bottom bracket shell of a bicycle; and FIG. 17 shows another schematic cut-away view of the locking system in FIG. 16.

DETAILED DESCRIPTION

In the following, embodiments of the invention will be described in further detail. Each specific variation of the features can be applied to other embodiments of the invention unless specifically stated otherwise. Note that for illustrative purposes the dimensions, especially thicknesses, of the different elements shown may be exaggerated.

Figure 1:
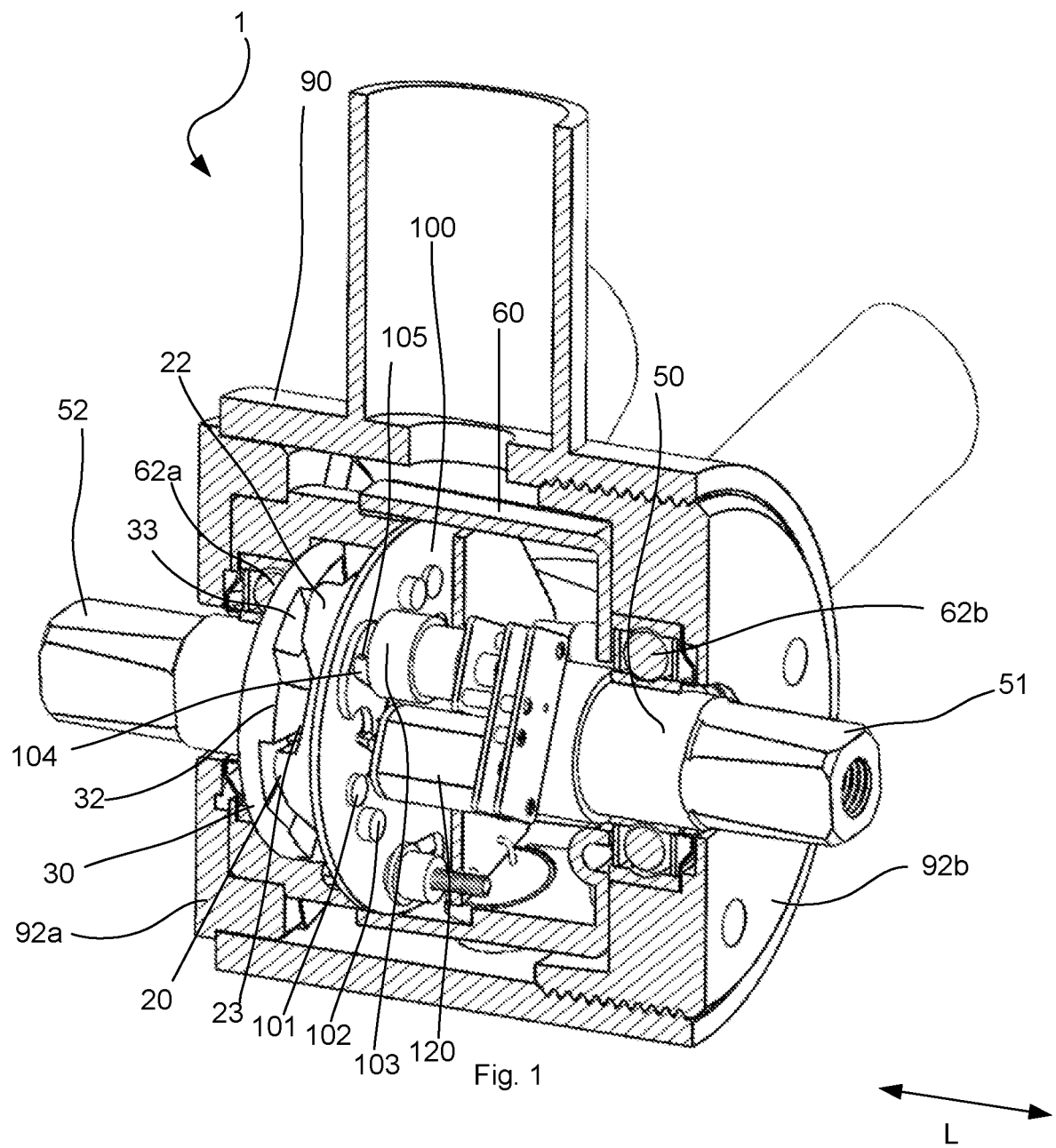
FIG. 1 shows a schematic perspective view of an embodiment of the locking system of the invention installed in a bottom bracket and in the disengaged state.

Turning first to FIG. 1, a first embodiment of a locking system 1 of the invention is shown from a side view in a disengaged state in a bottom bracket shell 90 of a bicycle. The locking system 1 comprises an axle 50 extending in a longitudinal direction L and being rotatable around its longitudinal axis. At its ends, the axle 50 comprises two engagement portions 51, 52, which are adapted to be connected to the pedal arms and the crank set of a bicycle (not shown), each engagement portion extending through an end cap 92b, 92a.

The locking system 1 further comprises a first locking element 30 arranged co-axially with and fixed to the axle 50 so that it is rotatable with the axle 50 inside a housing 60. The first locking element 30 has the shape of a disc, which is circular and slim to keep its moment of inertia low, whereby it will require less force from the cyclist to rotate.

The locking system 1 further comprises a second locking element 20 arranged co-axially with the axle 50. The second locking element 20 is displaceable along the longitudinal direction L so that it can be moved into contact with or away from the first locking element 30. The locking system 1 further comprises a biasing device 100 and an actuating element in the form of an electric motor 103 comprising an eccentric shaft 104, which engages with a guiding recess 105 (best seen in FIG. 9) in the biasing device 100.

The first and second locking elements 30, 20 both comprise an engagement surface 31, 21, which are seen in FIG. 5 and FIG. 4, respectively, and these engagement surfaces 31, 21 are arranged facing each other. The engagement surfaces 31, 21 comprises mutually corresponding protrusions 32, 22 and cavities 33, 23 so that the first and second locking element 30, 20 can be engaged by moving the protrusions 32, 22 of one into the cavities of the other 33, 23.

The first and second locking elements 30, 20 are thus movable between an engaged and a disengaged state by displacing and rotating the two locking elements 30, 20 in relation two each other. In the disengaged state shown in FIG. 1, the first and second locking elements 30, 20 are separated from each other so that the protrusions 32, 22 are not accommodated in the cavities 33, 23. The first locking element 30 and the axle 50 are thus free to rotate allowing the axle to transfer rotational movement to the wheels of the bicycle. In this embodiment, the biasing device 100 comprises three pairs of two permanent magnets 101, 102 positioned on the biasing device 100 such that the north pole of the magnets 101 and the south pole of the magnets 102 face in the direction towards the second locking element 20. The second locking element 20 in this embodiment comprises three permanent magnets 27 (as seen in FIG. 4) with their respective south pole facing in the direction towards the biasing device. In the disengaged state the magnets 101 are positioned opposite the magnets 27, so attracting the second locking element 20 to the biasing device 100. Similarly, is also possible to provide the second locking element 20 with a pair of magnets 101, 102 and the biasing device 100 with a magnet 27.

Figure 2:
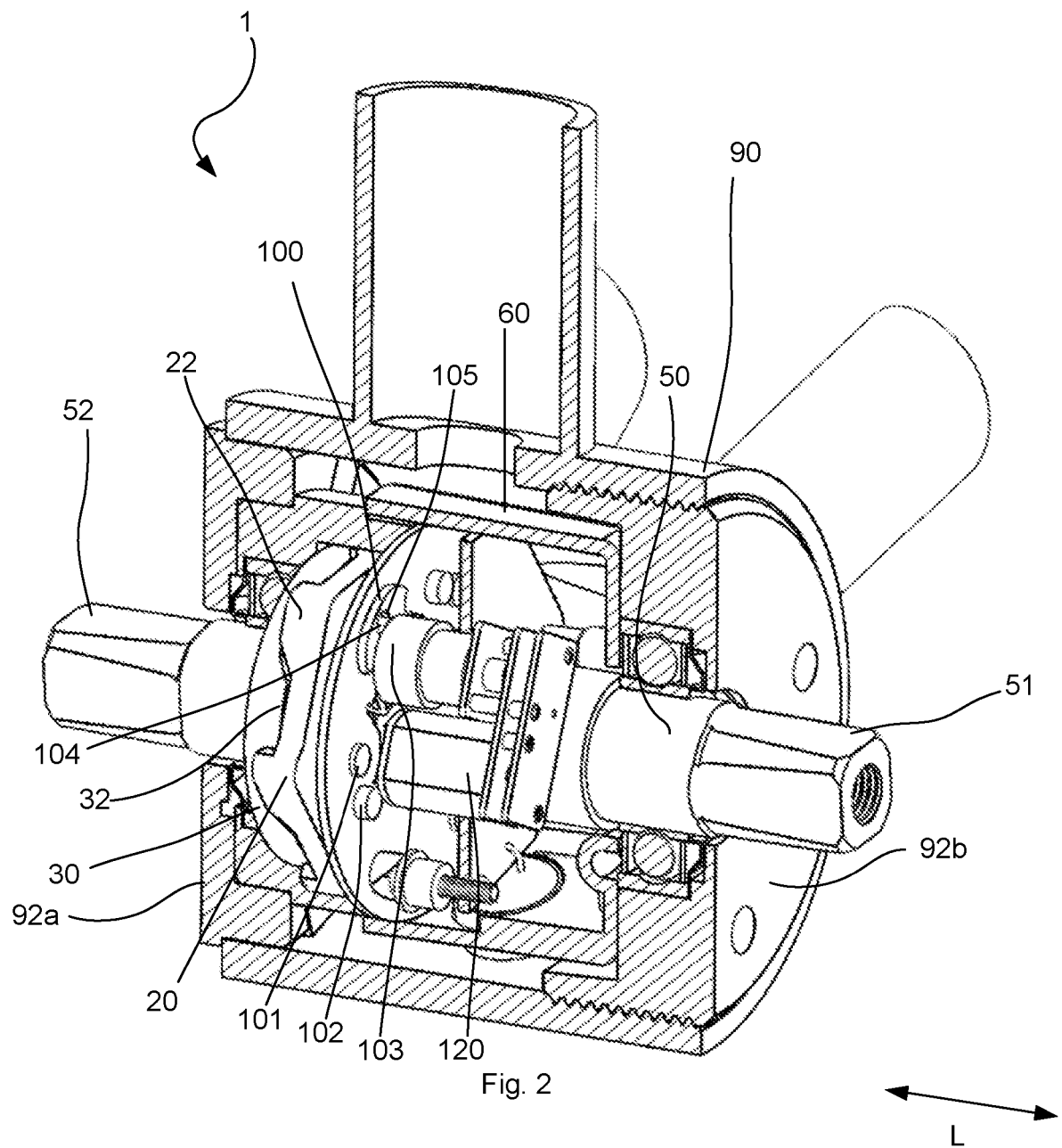
FIG. 2 shows the locking system in FIG. 1 in the engaged state.

To switch from the disengaged state to the engaged state as seen in FIG. 2, the electric motor 103 angularly displaces the biasing device 100, by turning the eccentric shaft 104 located in the guiding recess 105, such that the magnets 102 on the biasing device are positioned opposite the magnets 27 on the second locking element 20 (as seen in FIG. 11), so repelling and displacing the second locking element 20 towards the first locking element 30. Once the first locking element 30 is in an angular position, where the protrusions 32, 22 are aligned with the cavities 33, 23, the second locking elements 30 is displaced so that the protrusions 32, 22 are accommodated in the cavities 33, 23. The engagement between the non-rotatable second locking element 20 and the first locking element 30 thereby prevent rotation of the first locking element 30 and the axle 50, whereby the axle cannot be driven and the bicycle is locked.

As mentioned above, for locking elements 20, 30 with few orders of rotational symmetry on their engagement surfaces 21, 31, it is likely that the protrusions 32 of the first locking element 30 will be aligned with the protrusions 22 of the second locking element 20 when the biasing device 100 is actuated to displace the first and second locking elements 20, 30 in relation to each other, thus making it impossible for the biasing device to bring the locking elements 20, 30 into the engaged state. However, due to the force exerted by the biasing device 100 on the second locking element 20, the locking system 1 may self-lock once the axle 50, and thus also the first locking element 30, is rotated, e.g. by a thief, as the rotation of the axle 50 will bring the first locking element 30 into an angular position, in which the protrusions 22, 32 are aligned with the corresponding cavities 23, 33. When this angular position is reached, the force exerted on the second locking element 20 by the biasing device 100 will displace, i.e. force, the second locking element 20, to the position in the longitudinal direction L where the protrusions 22, 32 engage the corresponding cavities 23, 33. The owner of the bicycle may thereby be able to lock the bicycle simply by actuating the biasing device 100 without having to bring the pedals of the bicycle and thereby the axle 50 to a correct angular position.

Figure 3:
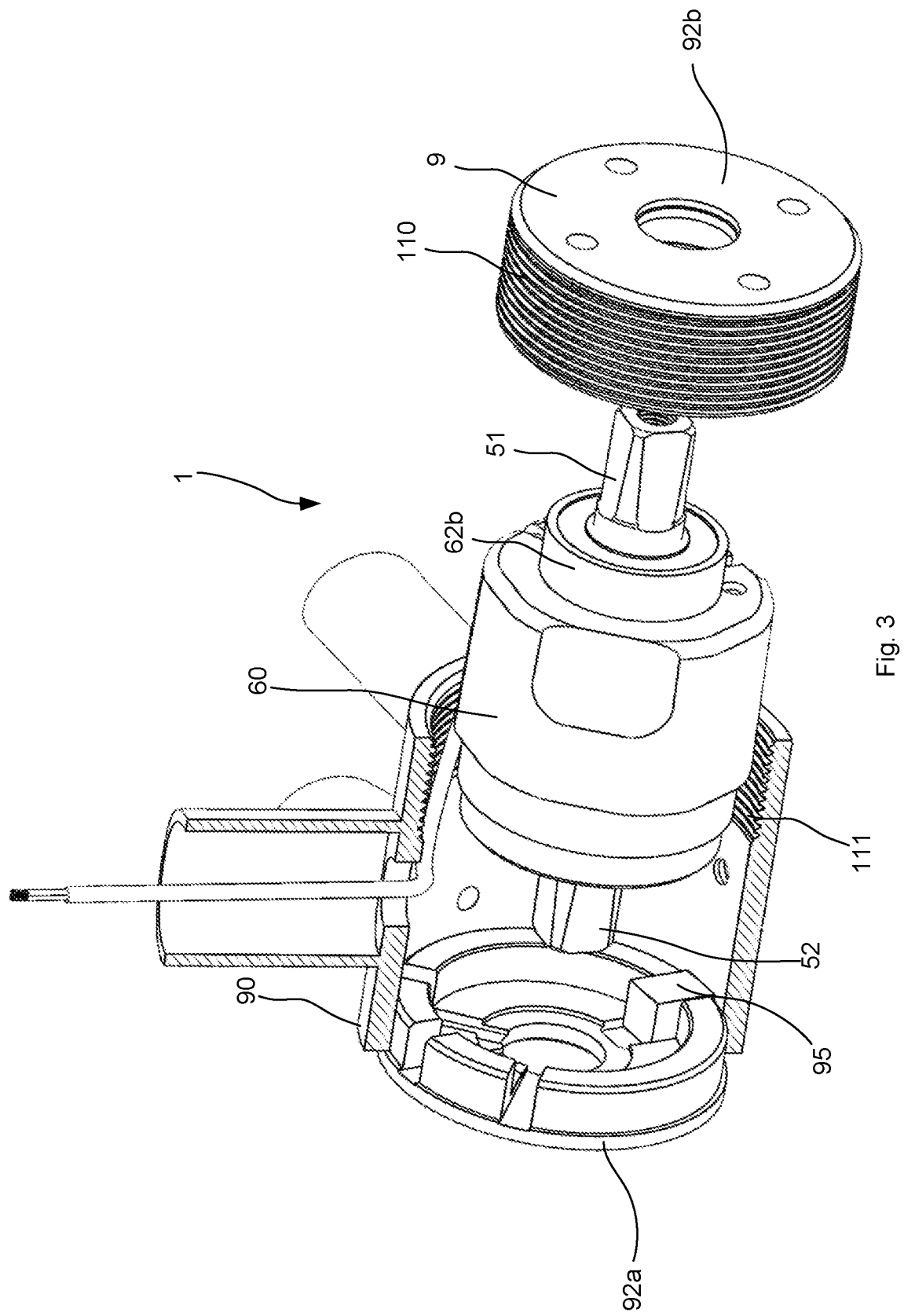
FIG. 3 shows the locking system of FIG. 1 in a cut-away perspective exploded view

To support the axle 50 and allow it to rotate with as little friction as possible, the locking system 1 comprises two ball bearings 62a, 62b, one at each end of the housing 60. The ball bearing 62a is located in the housing 60 and the ball bearing 62b is located in the endcap 92b, the ball bearings 62a, 62b fixating the axle 50 in a manner allowing rotation. As seen in FIG. 3, the end cap 92a is provided with a protrusion 95 which matches a corresponding cavity (not shown) in the housing 60, so that the housing 60 and locking system is prevented from rotating in the bottom bracket shell 90. The end cap 92a is here welded to the bottom bracket shell 90 and the end cap 92b is provided with a thread 110 for threading into the corresponding thread 111 in the bottom bracket shell 90.

FIGS. 4 and 5 show a perspective view of the first and second locking element 30, 20 respectively used by the embodiment of FIG. 1. As described above, the second locking element 20 is provided as a circular disc with an engagement surface 21 corresponding to the engagement surface 31 of the first locking element 30. In the shown embodiment, both engagement surfaces 21, 31 comprise a number of mutually corresponding protrusions 22, 32, in the form of teeth protruding from the engagement surfaces 21, 32, and cavities 23, 33 provided by the spaces between the teeth. The circular discs forming the first and second locking elements 30, 20 have been provided with a central through hole, through which the axle 50 can pass. The location of the three permanent magnets 27 is also shown.

In principle, the locking function of the locking system 1 can be achieved by a single protrusion on the engagement surface one of the first or second locking element 30, 20 and a single cavity on the other engagement surface. However, by providing multiple protrusions 22, 32 and cavities 23, 33 arranged so the engagement surfaces 21, 23 have a higher degree of rotational symmetry, the first locking element 30 will be able to assume multiple angular positions, in which the protrusions 22, 32 and cavities 23, 33 are aligned, whereby it will be easier to move the locking elements 20, 30 into the engaged state. Furthermore, by providing multiple protrusions 22, 32 and cavities 23, 33, the locking elements 20, 30 may achieve a better engagement, thereby making it more difficult to forcefully disengage the locking elements 20, 30, e.g. by applying a large torque on the axle 50 from the outside of the locking system 1.

On its outer angular surface, the second locking element 20 comprises multiple rotation preventing protrusions 24 adapted to fit into corresponding groves in either a housing of the locking system 1 or in the bottom crank bracket of the bicycle. The rotation preventing protrusions 24 thereby allowing for displacement in the longitudinal direction L, but not rotation.

Figure 6:
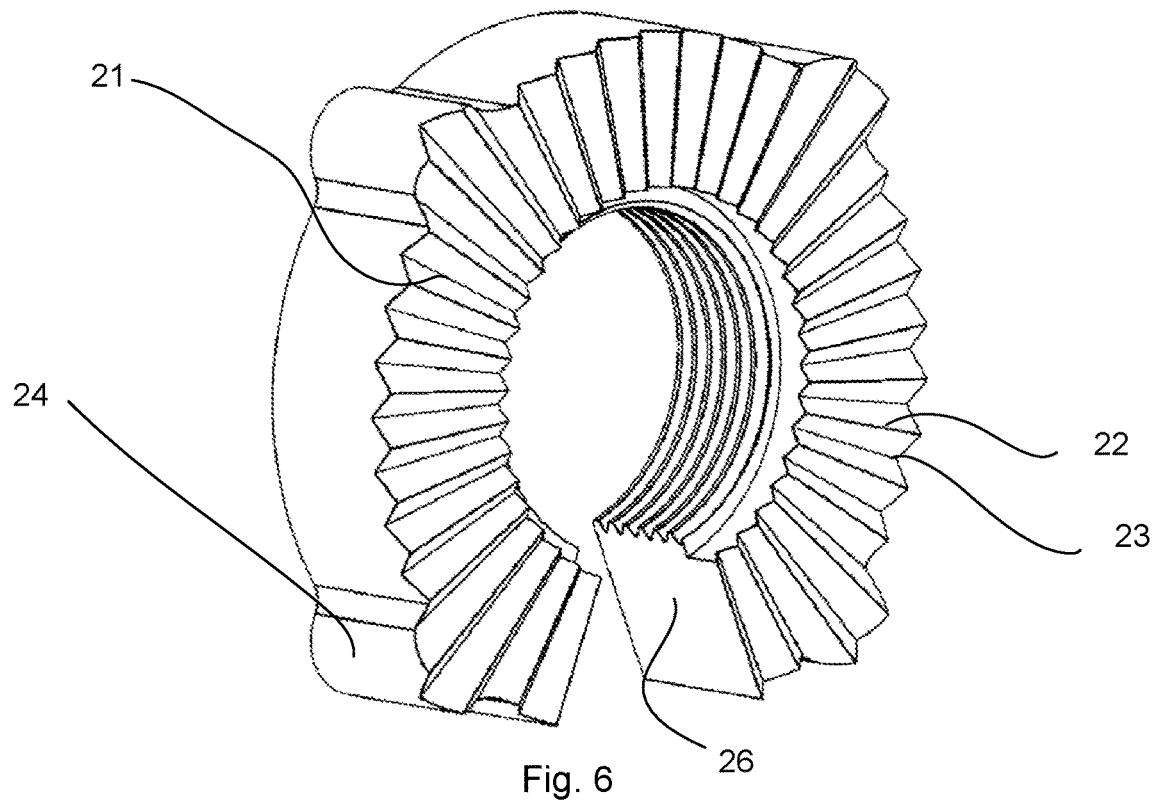
FIG. 6 shows a different embodiment of the second locking element of FIG. 4.

FIG. 6 shows a different embodiment of the second locking element 20 comprising a cut-out 26 which provides spacing for a component (not shown) such as a battery for powering the locking system, whilst still allowing the locking element 20 to be displaced in the longitudinal direction. The protrusions 22 are provided by triangular teeth on the engagement surfaces and corresponding cavities 23 are provided by the space between the teeth. When used, corresponding protrusions and cavities are provided on the first locking element. Such embodiments improve the locking of the locking system as the inclined side walls of the protrusions on the second locking element may slide against corresponding inclined side walls on the first locking element, thereby forcing the first locking element into an angular position in which the protrusions are aligned with the corresponding cavities.

Figure 7:
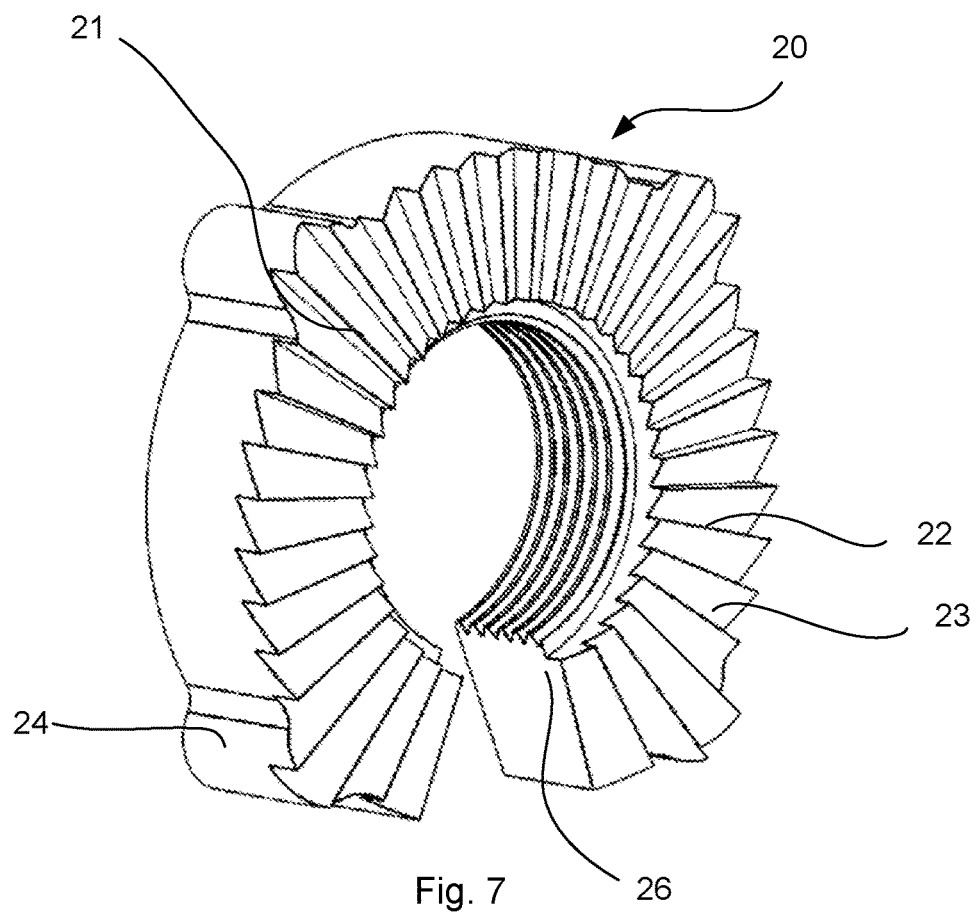
FIG. 7 shows an embodiment of the second locking element corresponding to FIG. 6 but comprising a different shape of protrusion.

FIG. 7 shows a different embodiment of the second locking element resembling that of FIG. 6 where the triangular teeth forming the protrusions 22, 32 have one side which is perpendicular with their respective engagement surface 21, 31 and one side with a shallow slope with respect to their respective engagement surface 21, 31. This makes it much harder to forcefully turn the axle in one rotational direction, i.e. the direction which drives the bicycle forward, when the locking elements 20, 32 are in the engaged state, while allowing the triangular teeth to cam over in the opposite rotational direction. This may allow the cyclist to pedal break, even if the locking system 1 is engaged during use of the bicycle.

Figure 8:
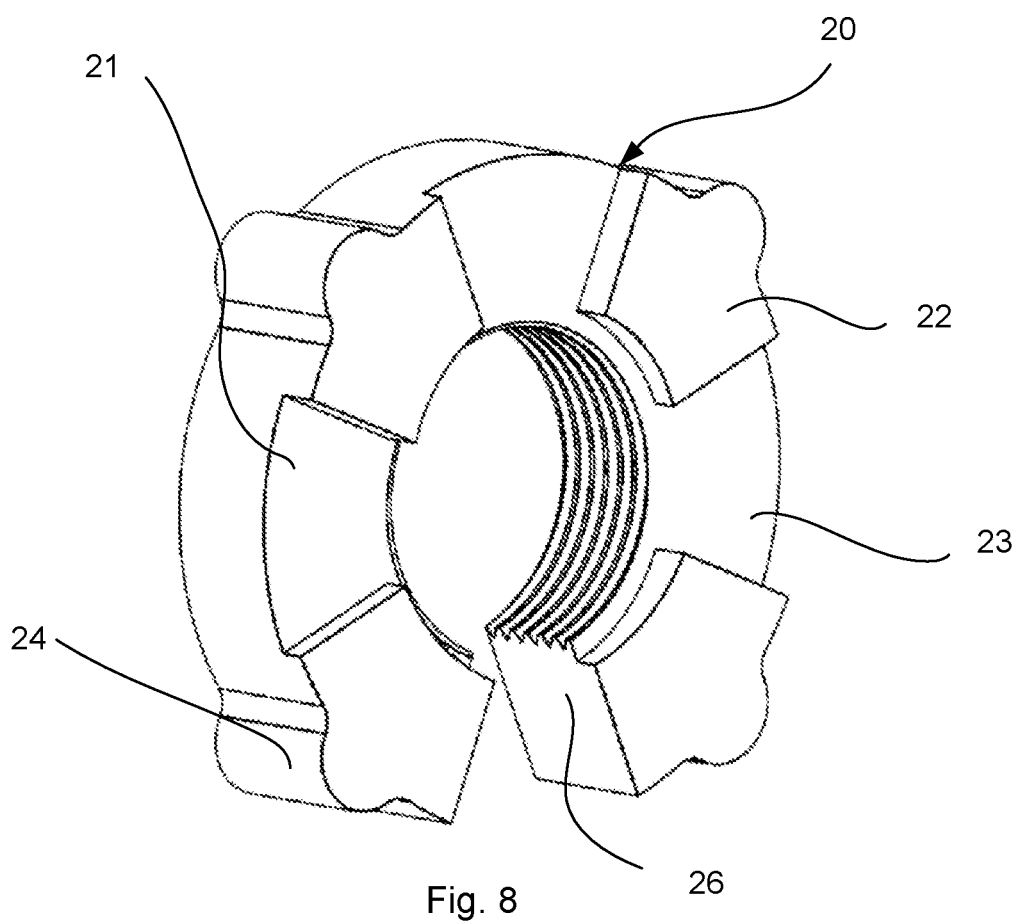
FIG. 8 shows another embodiment of the second locking element comprising a different shape of protrusions.

Turning to FIG. 8, another embodiment of the second locking element 20 is shown where the protrusions 22, 32 are formed by square protrusions with side walls that are perpendicular with their respective engagement surfaces 21, 31. The size and shape of these protrusions 22, 32 provide a particularly strong engagement in the engaged state, regardless of the rotational direction the axle may be forced in. This embodiment and others where the locking elements 20, 30 only have few folds of rotational symmetry are structurally simple, but the first locking element 20 only has a few angular positions, in which the protrusions 21, 31 are aligned with the cavities 22, 32.

Figure 9:
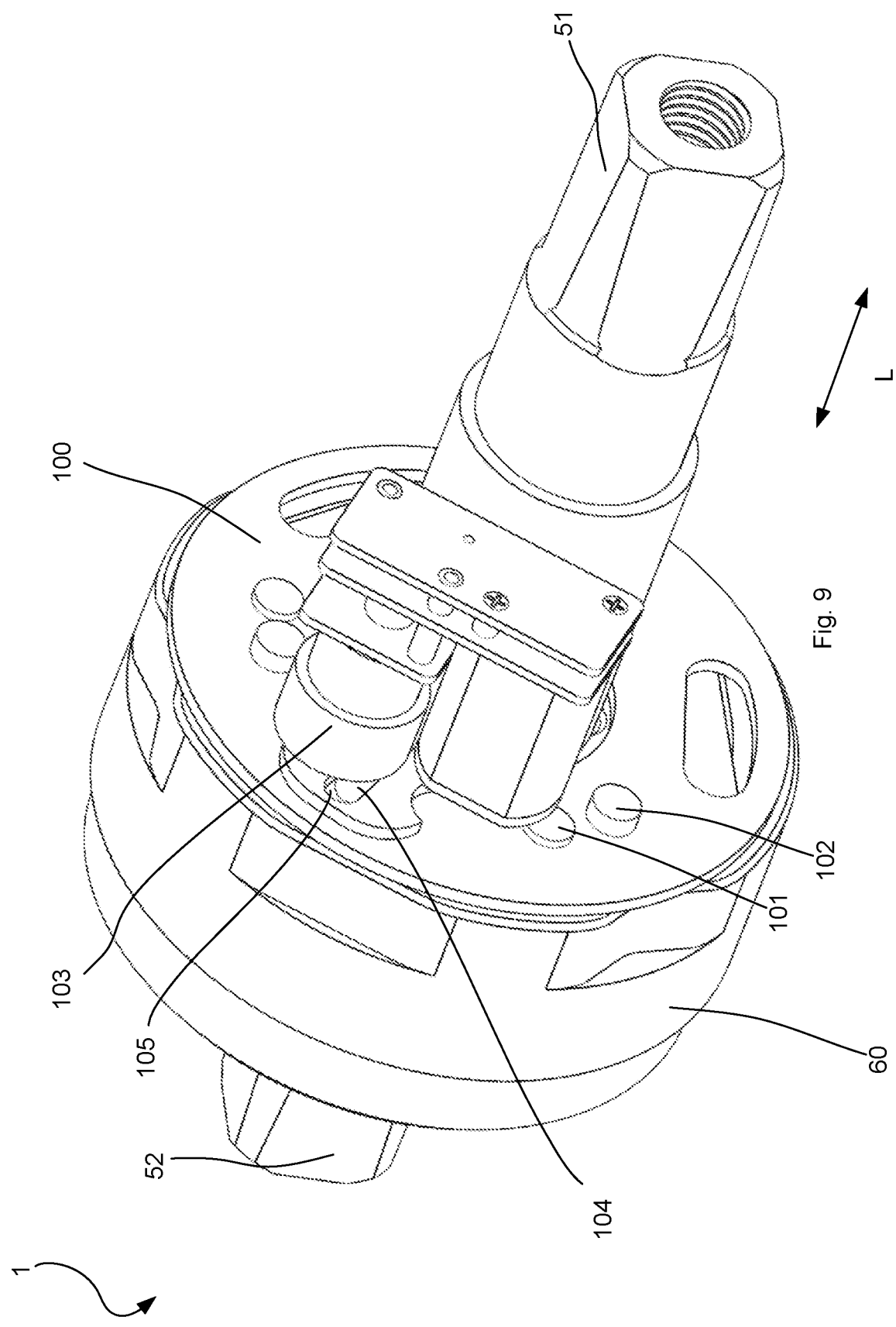
FIG. 9 shows a perspective view of the locking system of FIG. 1 in a housing.

Turning to FIGS. 9-11, the housing 60 of the locking system will be described. The housing 60 has an outer cylindrical shape adapted to fit into the bottom bracket shell 90 of a bicycle frame. The interior surface of the housing 60 has been provided with a number of grooves 61 with a shape corresponding to the rotation preventing protrusions 24 of the second locking element 20 so that the rotation preventing protrusions 24 can be slidably engaged in the grooves 61. The grooves 61 extend in the longitudinal direction L so that the second locking element 20 can slide inside the housing 60 while the rotation preventing protrusions 24 prevent the second locking element 20 from rotating.

FIG. 11 further shows an embodiment of the locking system 1, where the second locking element 20 is made from a ferromagnetic material, in this case steel, and comprise three permanent magnets 27. Similar to the other embodiments of the locking system 1, the second locking element 20 is forced into engagement with the first locking element 30 by being repelled by a permanent magnet 102 on the biasing device positioned opposite a permanent magnet 27 on the second locking element 20. However, in the disengaged state, the biasing device 100 is angularly displaced such that the magnet 102 is no longer positioned opposite the magnet 27, and as the second locking element 20 is ferromagnetic, it is attracted to the magnet 102 and so forced out of engagement with the first locking element 30. Being ferromagnetic, the second locking element 20 is attracted by all the magnets of the biasing device 100. The biasing device 100 can therefore be provided with magnets 102 all having the same pole facing the second locking element 20.

Figure 14:
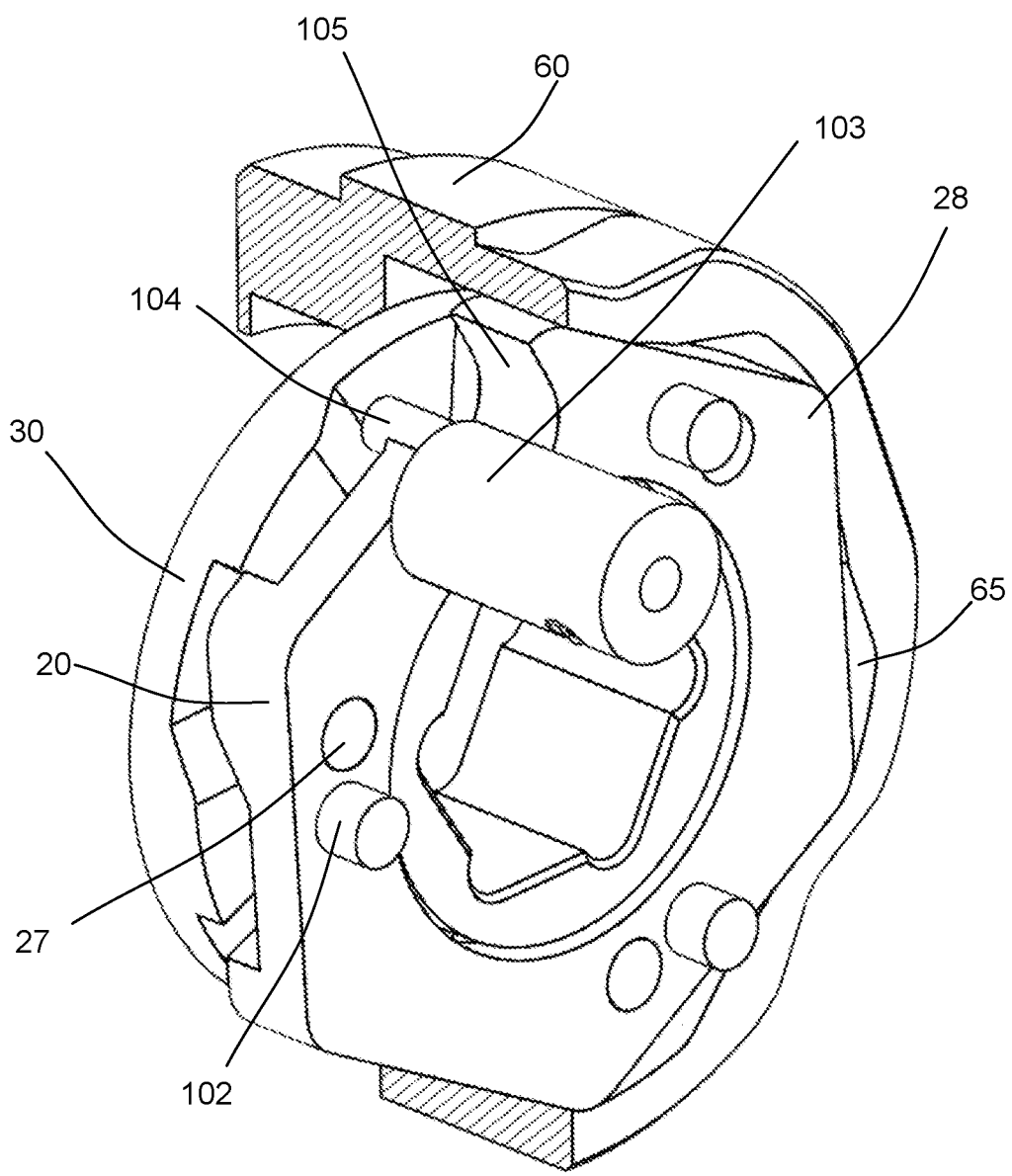
FIG. 14 shows a perspective cut-away view of another embodiment of the locking system in the disengaged state.

FIGS. 12-14 show an embodiment of the locking system 1 where the second locking element 20 is ferromagnetic and able to be angularly displaced, whereas the biasing device (of which only the magnets 102 are shown) does not rotate. The protrusions 28 of the second locking element 20 and the grooves 65 of the housing 60 are shaped such that the second locking element 20 can be angularly displaced i.e. rotated by 20 degrees. Similar to previous embodiments, the magnet 102 acts to repel and force the second locking element 20 into engagement with the first locking element 30, when positioned opposite the magnet 27 of the second locking element 20. In the engaged state of the locking elements 20, 30 the eccentric shaft 104 of the motor 103 engaging with the recess 105 in the second locking element 20, prevents the second locking element 20 and so the axle (not shown) from rotating, thus locking the bicycle. To switch from the engaged to the disengaged state, the motor 103 is actuated such that the eccentric shaft 104 moves to the other side of the recess 105 as seen in FIG. 13. This allows the second locking element 20 to rotate with the first locking element 30 until the recess 105 again abuts the eccentric shaft 104. Once the second locking element 20 is rotated such that magnet 27 is clear of the magnet 102, the magnet 102 attracts the ferromagnetic second locking element 20, thus forcing it out of engagement with the first locking element 30 into the disengaged state as seen in FIG. 14. To switch back to the engages state, the motor 103 is actuated such that the eccentric shaft 104 displaces the second locking element 20 back to the position where the magnets 27 and 102 are positioned opposite each other, thus forcing the second locking element 20 into engagement with the first locking element 30.

The locking system 1 comprises a wireless communications unit 120 adapted to actuate the motor, whereby the actuating element 103 and so biasing device may be actuated remotely. This removes any need for providing wiring to external buttons or the like and allows the user to comfortably lock or unlock his/her bicycle with a remote control or a wireless transmission/receiving unit, e.g. a smart phone.

FIGS. 15-17 show another embodiment of the bottom bracket shell 90 and end caps 92. FIG. 15 shows a cut-away view of a bottom bracket shell 90 without a locking system 1 of the invention housed therein. The bottom bracket shell 90 is formed by a cylindrical bore extending transversally through the frame of the bicycle. At both ends, the bottom bracket shell 90 is provided with a thread 91 formed on its inner surface, the threads 91 being adapted for engagement with corresponding threads 93 of a set of end caps 92 (only one shown in FIG. 15) so that the bottom bracket shell 90 can be closed. To allow wiring to be lead to and from the locking system, the bottom shell 90 is connected to the tubes of the frame of the bicycle by through holes 98, this allows an actuator or power supply to be placed elsewhere in the bicycle or to connect the locking system 1 to a dynamo.

FIGS. 16 and 17 show two different cut-away view of the bottom bracket shell 90 with a locking system 1 of the invention housed therein. Each of the end caps 92 has a circular through hole formed in the middle so that the axle (not shown) can extend through the bottom bracket shell 90 and a pedal can be attached at both ends of the axle as described with reference to FIG. 1. As mentioned above, to prevent the locking system 1 from rotating when housed in the bottom bracket shell 90, at least one of the end caps 92 is provided with multiple protrusions 95 corresponding to the indentations 63 formed in the housing 60 of the locking system 1. Rotation of the locking system 1 may, however, also be achieved with just one protrusion corresponding to an indentation formed in the housing 60.

Each end cap 92 is provided with a cylindrical support portion 96 which, when the end caps 92 are inserted into the bottom bracket shell 90, extends parallel with a centre axis of the bottom bracket shell 90, i.e. the support portions 96 extend into the bottom bracket shell 90. The support portions 96 have an inner diameter which is substantially identical to the outer diameter of the housing 60, while being smaller than the inner diameter of the shell 90. This allows the locking system to rest on the support portions 96, while providing an air gap between the housing 60 and the inner surface of the bottom bracket shell 90, so that electrical wiring to and from the motor can be accommodated in the air gap.

To further improve the security of the locking system 1 of the invention, the end caps 92 are adapted to be screwed in/out of the bottom bracket shell 90 by means of specialized tools adapted to engage two through holes 94 in the end caps 92 rather than readily available tools. This makes it more difficult for thieves to detach the end caps 92 to access or remove the locking system 1, while bicycle repair men having the specialized tools may still open the bottom bracket shell 90 for maintenance/replacement of the locking system 1.

As it not necessary to unscrew both end caps 92 to access the locking system 1, one of the end caps 92 is designed such, that when it is screwed into the bottom bracket shell 90, the surface of the end cap is substantially flush with the end of the bottom bracket shell 90 so that it cannot be engaged by plyers or similar tools. The other end cap 92 is provided with an outer rim 97 which prevents the end cap 92 from being screwed too far into the bottom bracket shell 90. Furthermore, this end cap 92 may be glued into engagement with the thread 91, whereby unscrewing will be made even more difficult.

Above the invention has been described with reference to a locking system configured for installation in a bottom bracket shell 90 of a bicycle, but the invention also applies to locking systems applied elsewhere on a bicycle.

What is claimed is:

1. A bicycle locking system for being mounted in a bicycle, the locking system comprising:
   an axle extending in a longitudinal direction, said axle being rotatable around its longitudinal axis;
   a first locking element and a second locking element configured for locking engagement with each other, said first locking element being fixed to the axle and each of the first and second locking elements comprising an engagement surface, said engagement surfaces comprising mutually corresponding protrusions and cavities,
   wherein the first and second locking elements are arranged at the axle with the engagement surfaces facing each other, and wherein the first and second locking elements are displaceable in relation to each other along the longitudinal axis so that the first and second locking elements are movable between an engaged state and a disengaged state,
   wherein, in the engaged state where the first and second locking elements are in locking engagement with each other, the first locking element is in an angular position, where the protrusions are aligned with the corresponding cavities, and the first and second locking elements are in a position in the longitudinal direction in relation to each other so that the protrusions are accommodated in the cavities, and
   wherein, in the disengaged state, the first and second locking elements are distanced from each other in the longitudinal direction so that the protrusions are not accommodated in the corresponding cavities, and
   wherein the locking system further comprises a biasing device and an actuation element, said biasing device being configured for exerting a force on the second locking element in the longitudinal direction, so as to displace the first and second locking elements in relation to each other, where the biasing device is a magnetic biasing device, and said actuation element acting to switch the locking system between a state where the biasing device magnetically repels the second locking element away from the biasing device and a state where the biasing device magnetically attracts the second locking element towards the biasing device;
   wherein the actuation element physically moves the biasing device by angular displacement.

2. The bicycle locking system according to claim 1, where the second locking element is non-rotatable.

3. The bicycle locking system according to claim 1, where the biasing device comprises at least one permanent magnet.

4. The bicycle locking system according to claim 1, where the second locking element comprises at least one permanent magnet.

5. The bicycle locking system according to claim 1, where the actuation element is electrically actuated.

6. The bicycle locking system according to claim 1, where the biasing device has an axis of rotation, and is arranged coaxially with an axis of rotation of the axle.

7. A bicycle comprising a bicycle locking system according to claim 1, wherein the locking system is arranged in a bottom bracket shell of the bicycle frame or in a wheel of the bicycle.

8. The bicycle of claim 7, wherein the locking system is arranged in the bottom bracket shell of the bicycle frame, and wherein the bottom bracket shell is closed by end caps having a central through hole, through which the axle extends, and said end caps comprising a cylindrical portion extending into the bottom bracket shell, wherein the locking system is fixed in the cylindrical portions of the end caps.

9. The bicycle according to claim 8, where said cylindrical portions having an inner diameter smaller than the diameter of the bottom bracket shell so that a gap is formed between the locking system and the bottom bracket shell around the locking system.

10. A bicycle locking system for being mounted in a bicycle, the locking system comprising:
    an axle extending in a longitudinal direction, said axle being rotatable around its longitudinal axis;
    a first locking element and a second locking element configured for locking engagement with each other, said first locking element being fixed to the axle and each of the first and second locking elements comprising an engagement surface, said engagement surfaces comprising mutually corresponding protrusions and cavities,
    wherein the first and second locking elements are arranged at the axle with the engagement surfaces facing each other, and wherein the first and second locking elements are displaceable in relation to each other along the longitudinal axis so that the first and second locking elements are movable between an engaged state and a disengaged state,
    wherein, in the engaged state where the first and second locking elements are in locking engagement with each other, the first locking element is in an angular position, where the protrusions are aligned with the corresponding cavities, and the first and second locking elements are in a position in the longitudinal direction in relation to each other so that the protrusions are accommodated in the cavities, and
    wherein, in the disengaged state, the first and second locking elements are distanced from each other in the longitudinal direction so that the protrusions are not accommodated in the corresponding cavities, and
    wherein the locking system further comprises a biasing device and an actuation element, said biasing device being configured for exerting a force on the second locking element in the longitudinal direction, so as to displace the first and second locking elements in relation to each other, where the biasing device is a magnetic biasing device, and said actuation element acting to switch the locking system between a state where the biasing device magnetically repels the second locking element and a state where the biasing device magnetically attracts the second locking element,
    wherein the locking system further comprising a wireless communications unit for actuating the actuation element.

11. A bicycle locking system for being mounted in a bicycle, the locking system comprising:
    an axle extending in a longitudinal direction, said axle being rotatable around its longitudinal axis;
    a first locking element and a second locking element configured for locking engagement with each other, said first locking element being fixed to the axle and each of the first and second locking elements comprising an engagement surface, said engagement surfaces comprising mutually corresponding protrusions and cavities,
    wherein the first and second locking elements are arranged at the axle with at least a portion of the engagement surfaces axially facing each other, and wherein the first and second locking elements are displaceable in relation to each other along the longitudinal axis so that the first and second locking elements are movable between an engaged state and a disengaged state, wherein, in the engaged state where the first and second locking elements are in locking engagement with each other, the first locking element is in an angular position, where the protrusions are aligned with the corresponding cavities, and the first and second locking elements are in a position in the longitudinal direction in relation to each other so that the protrusions are accommodated in the cavities, and wherein, in the disengaged state, the first and second locking elements are distanced from each other in the longitudinal direction so that the protrusions are not accommodated in the corresponding cavities, and wherein the locking system further comprises a biasing device and an actuation element, said biasing device being configured for exerting a force on the second locking element in the longitudinal direction, so as to displace the first and second locking elements in relation to each other, where the biasing device is a magnetic biasing device, and said actuation element acting to switch the locking system between a state where the biasing device magnetically repels the second locking element and a state where the biasing device magnetically attracts the second locking element.

* * * * *